(12) United States Patent
Justice

(10) Patent No.: US 7,981,818 B2
(45) Date of Patent: Jul. 19, 2011

(54) BATTERY SEPARATOR STRUCTURES

(75) Inventor: William N. Justice, Waverly, OH (US)

(73) Assignee: P. H. Glatfelter Company, York, PA (US)

( * ) Notice: Subject to any disclaimer, the term of this patent is extended or adjusted under 35 U.S.C. 154(b) by 337 days.

(21) Appl. No.: 12/331,820

(22) Filed: Dec. 10, 2008

(65) Prior Publication Data
US 2009/0148760 A1 Jun. 11, 2009

Related U.S. Application Data

(60) Provisional application No. 61/007,082, filed on Dec. 11, 2007.

(51) Int. Cl.
*H01M 2/16* (2006.01)
(52) U.S. Cl. .......... 442/33; 442/35; 442/44; 442/50; 442/57; 429/247; 429/249; 429/251; 429/254; 429/228; 429/144; 429/129; 429/142
(58) Field of Classification Search .............. 429/247, 429/249, 251, 254, 228, 144, 129, 142; 442/33, 442/35, 44, 50, 57
See application file for complete search history.

(56) References Cited

U.S. PATENT DOCUMENTS

| | | | |
|---|---|---|---|
| 4,137,377 A | 1/1979 | McClelland | |
| 4,606,982 A | 8/1986 | Nelson et al. | |
| 5,091,275 A * | 2/1992 | Brecht et al. | 429/247 |
| 7,144,633 B2 | 12/2006 | Zguris et al. | |
| 2006/0286446 A1* | 12/2006 | Chun et al. | 429/142 |
| 2008/0014506 A1* | 1/2008 | Sugiyama et al. | 429/246 |
| 2008/0274409 A1* | 11/2008 | Harada et al. | 429/247 |
| 2009/0261035 A1* | 10/2009 | Arora et al. | 210/510.1 |

FOREIGN PATENT DOCUMENTS

| | | |
|---|---|---|
| JP | 55090055 | 7/1980 |
| WO | WO 97/11501 | 3/1997 |
| WO | WO 2005124895 A1 * | 12/2005 |

OTHER PUBLICATIONS

Del Piero, Giannino; "International Search Report"; May 28, 2009; 3 pp; European Patent Office, Rijswijk, The Netherlands.

* cited by examiner

*Primary Examiner* — Elizabeth M Cole
(74) *Attorney, Agent, or Firm* — RatnerPrestia

(57) ABSTRACT

A multilayer composite sheet for use in a lead-acid battery includes
  a) a base layer including paper or a glass fiber mat;
  b) a layer of polymeric nanofibers bonded with discrete adhesive particles to a first surface of the base layer; and
  c) a scrim layer bonded with discrete adhesive particles to a surface of the layer of nanofibers opposite the base layer.
A plate assembly for a lead-acid battery includes one or more multilayer composite sheets located adjacent or partially enclosing a lead plate.

15 Claims, 5 Drawing Sheets

BATTERY SEPARATOR STRUCTURES

CROSS REFERENCE TO RELATED APPLICATIONS

This application claims priority benefit of U.S. Provisional Appln. No. 61/007,082, filed Dec. 11, 2007, the entirety of which is incorporated herein by reference.

BACKGROUND OF THE INVENTION

Lead-acid batteries contain lead plates that may be prepared by applying an aqueous paste of lead oxide (PbO) to a lead grid and then drying the grid. In some methods, for example continuous casting methods, the lead oxide is held in place by a pasting paper while the plate is dried. In other methods, such as strip casting methods, pasting paper is not needed.

Once dry, the plates are "formed" by applying an electrical charge to the plates while they are immersed in a 6 molar sulfuric acid solution, resulting in the creation of positive and negative plates. Newer production methods involve addition of expander materials (powdered sulfates) to the paste to produce negative plates, thereby eliminating the need to form the plates. In either case, a separator is then inserted between plates of opposite polarity, physically separating them. The separator's primary purpose is to prevent a short circuit due to particles bridging between plates of opposite charge. Once the separator is applied, oppositely paired plates are placed into a cell of the battery housing, electrolyte (dilute sulfuric acid) is added, and the cover is attached. The pasting paper (if present) typically degrades over time due to contact with the electrolyte.

A typical separator is a glass fiber mat. Although the mat must act as a barrier in the sense of preventing particle bridging between the plates, it should not interfere excessively with ion transfer in solution between the plates or reduced performance will result. The latter property encourages use of a relatively open, porous mat, but this may require the mat to be thicker to prevent particle bridging. Conventional separators have an overall thickness from 4-6 mm (0.157-0.236 in). This consumes additional volume in the battery and displaces electrolyte. This limits battery performance in terms of capacity and discharge rate, due to the lower amount of sulfuric acid available for ion exchange. Also, the trend towards smaller physical battery sizes makes these bulky conventional separators less than ideal.

In some batteries, the glass mat separator may be a so-called "absorptive glass mat" that fills essentially the entire space between plates, but that absorbs the sulfuric acid electrolyte such that there is essentially no free liquid acid. Such a battery may be used upside down or on its side without fear of acid spillage. Many of the same issues apply to absorptive glass mats as apply to traditional separators, i.e., that the desire to minimize thickness and still prevent particle bridging tend to be at cross purposes.

Thus, methods and devices for separating battery plates that address these or other current limitations of lead-acid batteries would be commercially beneficial.

SUMMARY OF THE INVENTION

In one aspect, the invention provides a multilayer composite sheet for use in a lead-acid battery. The sheet includes
 a) a base layer including paper or a glass fiber mat;
 b) a layer of polymeric nanofibers bonded with discrete adhesive particles to a first surface of the base layer; and
 c) a scrim layer bonded with discrete adhesive particles to a surface of the layer of nanofibers opposite the base layer.

In another aspect, the invention provides a plate assembly for a lead-acid battery. The plate assembly includes a lead plate having first and second opposing surfaces coated respectively with first and second layers including lead oxide, the first and second layers contacting first and second multilayer composite sheets respectively, each of the composite sheets including:
 a) a paper base layer;
 b) a layer of polymeric nanofibers bonded with discrete adhesive particles to a first surface of the paper base layer; and
 c) a scrim layer bonded with discrete adhesive particles to a surface of the layer of nanofibers opposite the paper base layer;
 wherein each of the first and second layers of the plate is adjacent and bonded to the paper base layer of the first and second multilayer composite sheets respectively on a second surface thereof opposite the first surface, and wherein the first and second multilayer composite sheets are adhered together so as to enclose the lead plate on three sides.

In yet another aspect, the invention provides a plate assembly for a lead-acid battery. The plate assembly includes a lead plate having first and second opposing surfaces coated respectively with first and second layers including lead oxide, at least one of the first and second layers contacting a multilayer composite sheet including:
 a) a glass fiber mat base layer;
 b) a layer of polymeric nanofibers bonded with discrete adhesive particles to a first surface of the glass fiber mat base layer; and
 c) a scrim layer bonded with discrete adhesive particles to a surface of the layer of nanofibers opposite the glass fiber mat base layer;
 wherein the at least one of the first and second layers of the plate is adjacent the glass fiber mat base layer of the multilayer composite sheet on a second surface thereof opposite the first surface.

DETAILED DESCRIPTION OF THE INVENTION

Figure 1A:
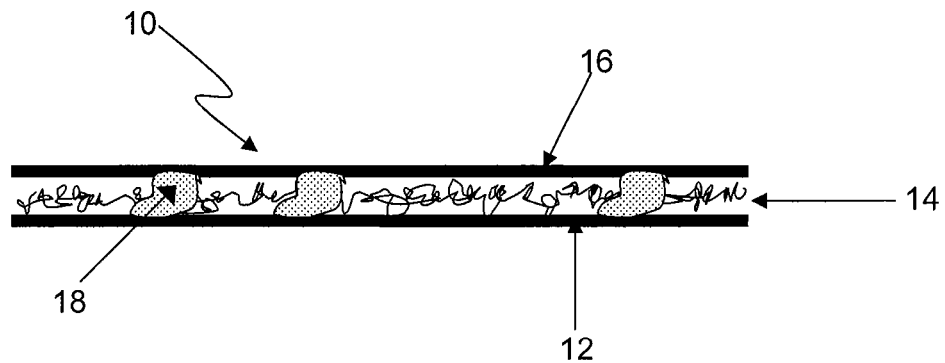
FIG. 1a is a schematic diagram of a multilayer composite sheet suitable for use as a battery separator according to the invention.
Figure 1B:
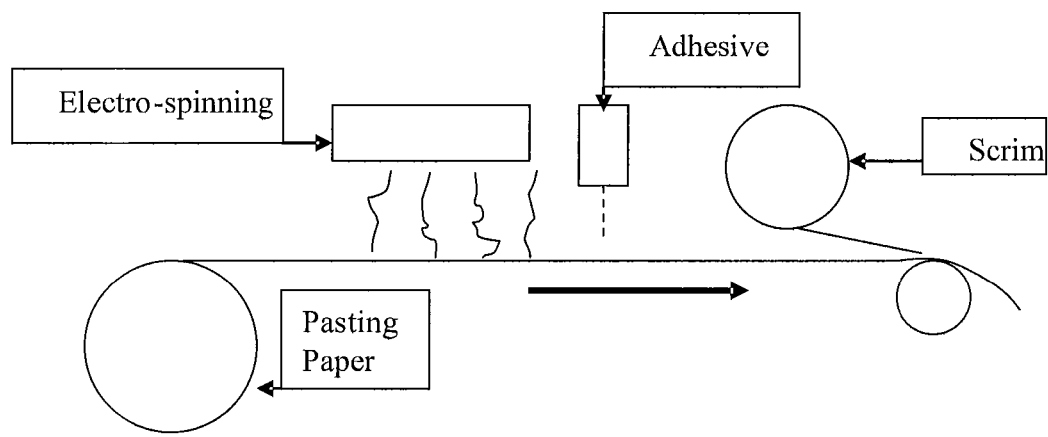
FIG. 1b is a schematic diagram of equipment suitable for manufacturing a multilayer composite sheet according to the invention.
Figure 2:
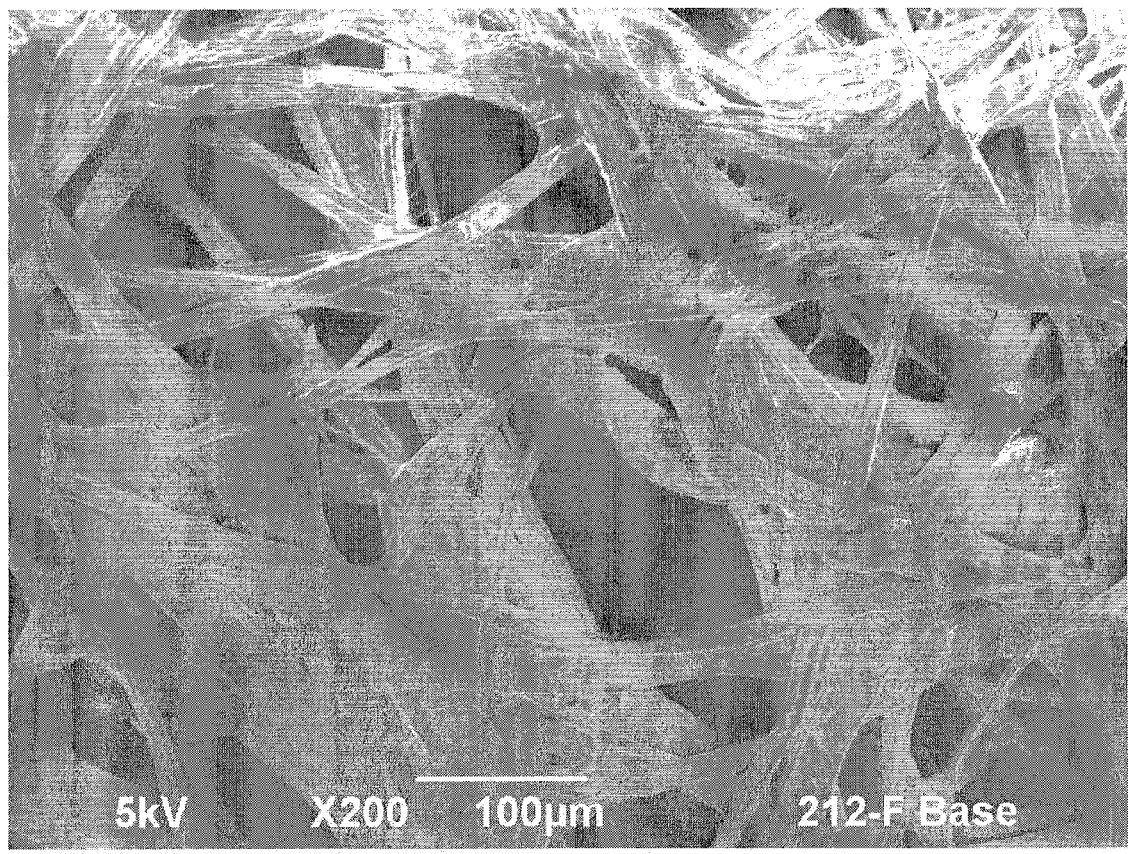
FIG. 2 is a photomicrograph of paper suitable for making a multilayer composite sheet according to the invention.
Figure 3:
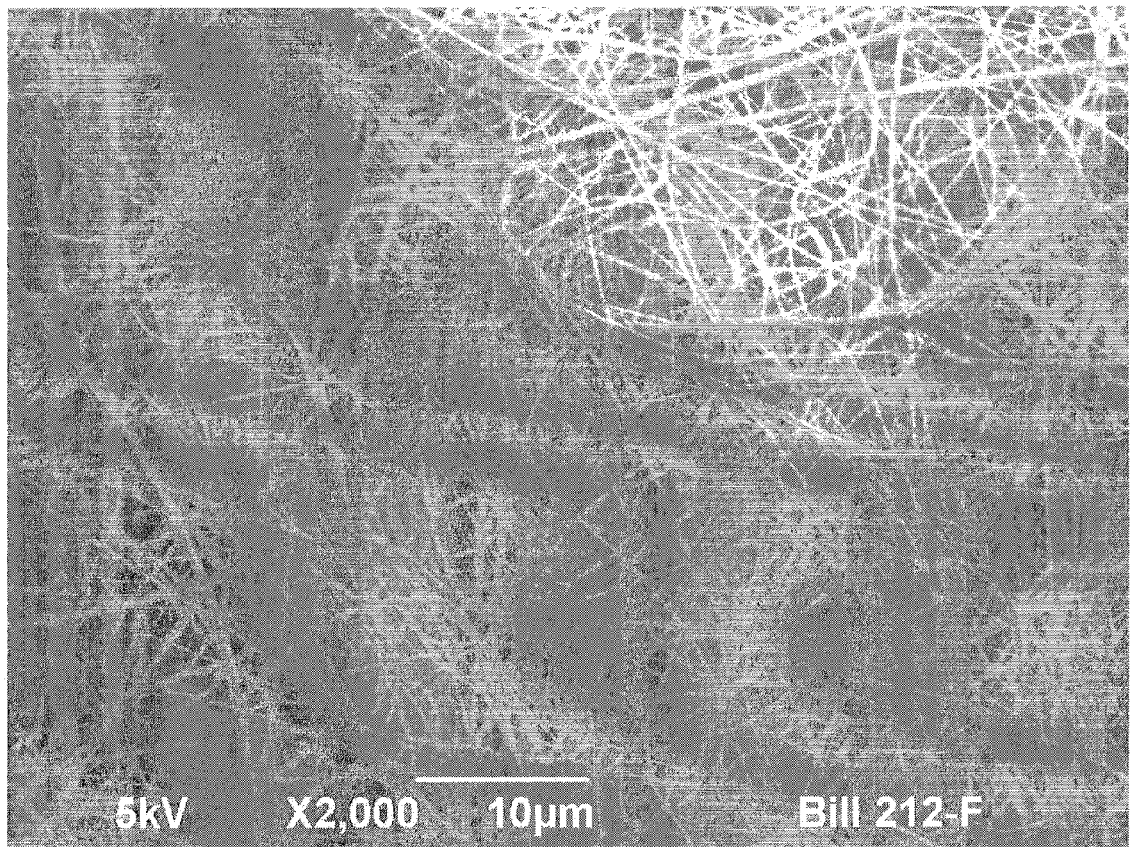
FIG. 3 is a photomicrograph of a nanofiber layer web suitable for making a multilayer composite sheet according to the invention.
Figure 4:
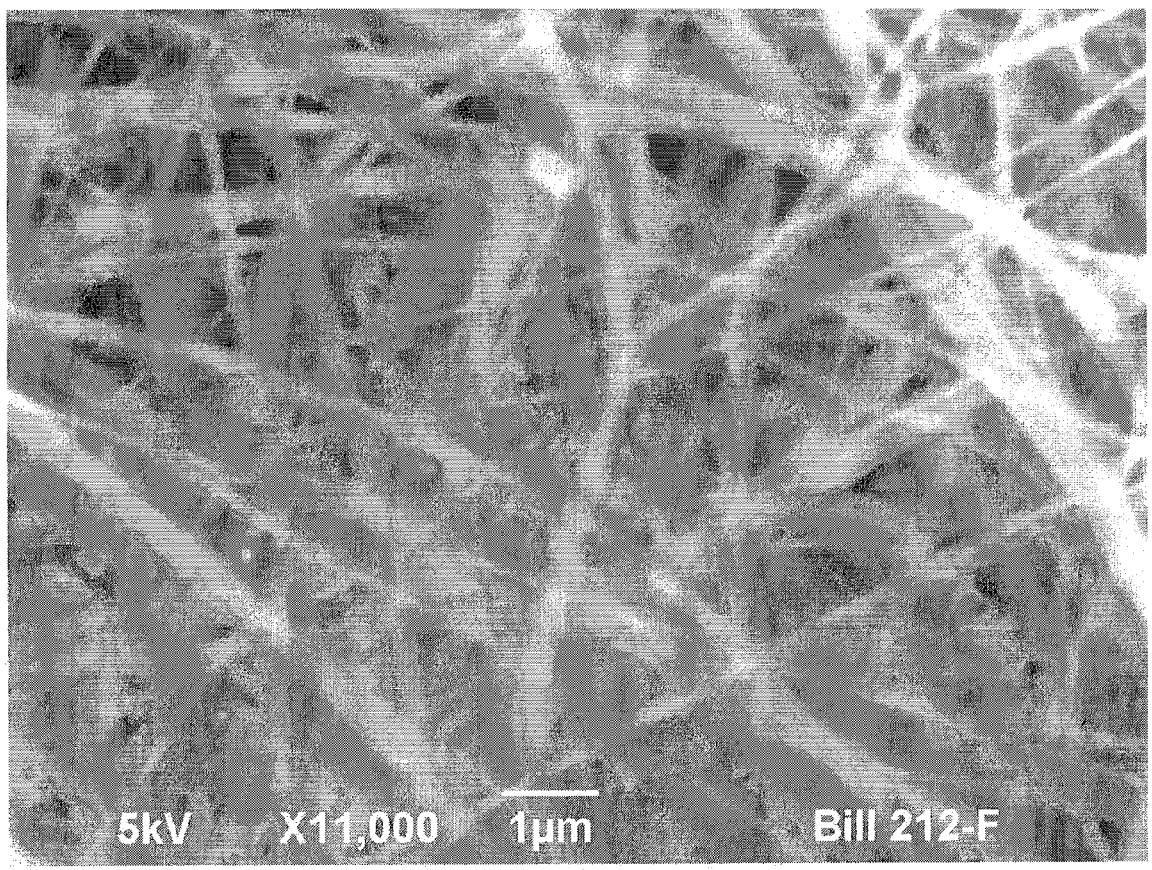
FIG. 4 is a photomicrograph of the nanofiber layer web of FIG. 3 at higher magnification.
Figure 5:
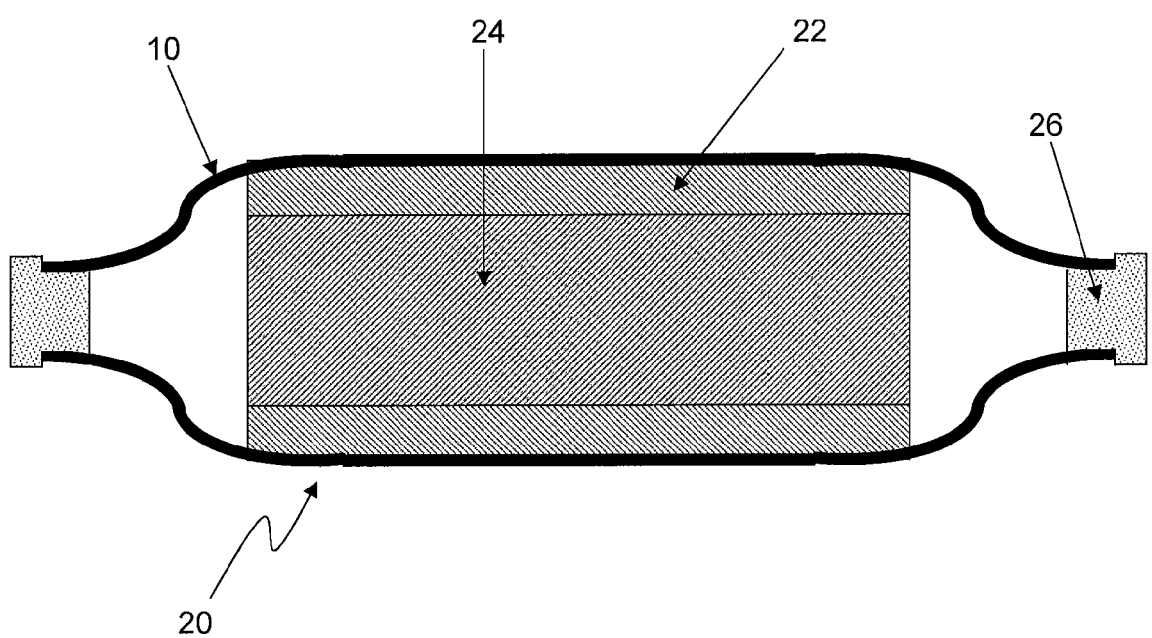
FIG. 5 is a cross-sectional schematic diagram of a battery plate employing a multilayer composite sheet according to the invention.

The invention will now be described with reference to the Figures, wherein similar numbers indicate similar features. The figures depict certain nonlimiting embodiments of the invention. FIGS. 1a, 1b and 5 are not to scale, and are not intended to serve as engineering drawings.

The invention provides a multilayer composite sheet suitable for use as a battery separator, shown schematically in FIG. 1a. In some embodiments, the sheet may be used as a combined battery pasting paper/separator, as will now be discussed. The sheet, shown generally at 10, includes a fibrous layer 12 upon which resides an electrically nonconductive polymeric nanofiber layer 14, upon which in turn resides a polymeric scrim layer 16. In the present case, the fibrous layer 12 is a pasting paper. Discrete particles of adhesive 18 adhere the nanofiber layer to both the paper layer and the scrim layer, thereby integrating the three layers to form the composite sheet. In this particular embodiment, the adhesive permeates the nanofiber layer such that a given adhesive particle may directly contact all three layers simultaneously. However, it is also suitable for some adhesive particles to adhere the paper and nanofiber layers to each other while others adhere the nanofiber layer to the scrim layer.

Fibrous layer 12 may be any grade of paper ordinarily used for battery pasting purposes. Manufacturers of suitable papers include Glatfelter, Crystex, MB Papeles, and Purico. The paper serves the usual function of a pasting paper, i.e., it allows good adhesion of the lead oxide slurry to the plate during its preparation.

Nanofiber layer 14 is easily permeable to the electrolyte, but essentially impermeable to particles of lead compounds that may be present in the battery. Thus, the nanofiber layer acts as a separator, preventing such particles from forming bridges between and the plates and short circuiting the battery.

The diameter of the nanofibers is typically at least 40 nm and more typically at least 100 nm. The diameter is typically at most 1000 nm, more typically at most 700 nm, and most typically at most 400 nm. The nanofiber layer is generally at most 5000 nm thick, or at most 3000 nm thick. It is typically at least 200 nm thick, or at least 500 nm thick, or at least 1000 nm thick, and most typically about 2000 nm thick on average. The layer will have average pore diameters typically at most 1000 nm and more typically at most 500 nm. The pores are usually at least 100 nm in diameter on average. Suitable nanofiber materials are typically synthetic polymers, and include polymers that are chemically resistant to the electrolyte. These and include nylon, polyvinyl chloride, polystyrene, polypropylene, polyethylene, and copolymers of ethylene and/or propylene with alpha olefins.

Scrim layer 16 provides support for the nanofiber web, and is made of an electrically nonconductive material that is chemically resistant to sulfuric acid. The scrim will typically have a rather open structure and will generally have a web thickness of 0.5-2 mm (0.02-0.08 in) in order to provide sufficient strength as well as physical separation of the plates. It may be made of materials similar to those described above for making the nanofiber layer. One exemplary scrim is a light nonwoven polypropylene sold under the name Pureflow. Various mesh screens such as those made of nylon, polypropylene, and polyethylene may also be used. Adhesive particles 18 may be prepared from a hot melt adhesive, for example Loctite's Hysol SprayPac Polyshot.

Several advantages may be realized by using a multilayer composite sheet according to the invention as a combined battery pasting paper/separator. The increased volume of electrolyte gained through the replacement of a traditional thick separator with the present thinner one will typically increase battery capacity, and the additional volume will typically also improve battery performance through better wetting of the plate and increased acid transport. Electrical resistance will typically be reduced due to the finer matrix of the nanofiber web, thus resulting in higher available discharge rates. Material and process costs will typically be significantly reduced by eliminating the need to manufacture and install a stand-alone separator.

In another embodiment, fibrous layer 12 of the multilayer composite sheet 10 is an absorptive glass mat. Such a structure may be particularly useful as a separator for plates prepared by strip casting, which do not require the use of pasting paper. As noted above, the absorptive glass mat absorbs the sulfuric acid electrolyte so as to prevent spillage when the battery is used on its side or upside down. But the mat may be much thinner than in traditional applications because it need not act as a separator, which function is performed by the nanofiber layer 14. This makes it possible to reduce the physical size of the battery while maintaining good performance. Suitable absorptive glass mats are described in U.S. Pat. Nos. 5,091,275 and 7,144,633, both of which are incorporated herein by reference.

In some embodiments, the absorptive glass mats comprise borosilicate glass fibers. In some embodiments, the glass mat can be handled in a rigid, compressed state during battery assembly but subsequently expands once immersed in the electrolyte between the battery plates. Such a mat may be formed of glass micro-fibers and impregnated with an aqueous binder mixture comprising colloidal silica particles and a sulfate salt. The impregnated mat is dried and compressed, so that the salt coagulates the silica particles within the mat, thereby preventing migration of the silica particles to the surface of the mat as the mat is dried. The binder remains evenly distributed throughout the mat as it dries, and holds the dried mat in a rigid, compressed state so that it is easily handled.

In some embodiments, the mat is compressed and dried to a thickness that is slightly less than the specified distance between the electrode plates, leaving room also for the nanofiber layer and the scrim layer. Consequently, a single mat may be placed between each pair of electrode plates within the battery without the use of complex equipment for compressing the mat between the plates during the assembly process. Alternatively, the mats may be shaped during preparation such that they may be placed in pairs on opposite sides of a plate and adhered together, as will be discussed below with respect to FIG. 5.

As the battery electrolyte contacts the binder, the salt dissolves within the electrolyte, leaving behind the silica particles. These have a high surface area and the appropriate surface chemistry for facilitating oxygen transport between the positive and negative electrodes. As the binder salt dissolves, the mat expands against the surfaces of the electrode plates to fill in the space between the plates.

Production of the Multilayer Composite Sheet

The composite sheet may be prepared by any of a variety of methods, and suitable equipment for one exemplary method is shown schematically in FIG. 1b. the method will be described with respect to the use of paper for fibrous layer 12, but similar methods can be used if an absorptive glass mat is used instead. The initial step involves electro-spinning a polymeric layer of nanofibers onto the battery pasting paper. Subsequently, discrete droplets of a chemically resistant adhesive (for example, a hot melt adhesive, although others may be used) are deposited on the surface of the nanofibers. This may be accomplished with a pneumatic sprayer, which results in deposition of miniscule discrete droplets of adhesive rather than a uniform film. By avoiding a uniform film of adhesive, good permeability is maintained through the nanofibers and the attached scrim. Finally, the scrim is applied over the deposited adhesive. This is similar to lamination, as the scrim can be applied via a roll directly over a moving web of the paper/nanofiber assembly and the final composite sheet subsequently rolled up. The finished rolls are then slit according to desired sizes.

Battery Plates Using the Multilayer Composite Sheet

Attention is drawn to FIG. 5, which depicts a battery plate indicated generally at 20 incorporating a multilayer composite sheet 10 according to the invention as a combined pasting paper/separator. The pasting paper/separator 10 is first applied to both sides of a lead plate (typically a grid) 24 which has previously been coated with aqueous lead oxide paste 22, with the paper side contacting the lead oxide. This holds the paste to the grid 24 throughout plate manufacture. On three of the four sides of the plate, both of the pasting paper/separator composite sheets extend beyond the edge of the grid, so that they may be sealed together to create a unified enclosure around the plate on three sides. This may be accomplished with a mechanical sealing machine, thermal sealer, or hot melt sealer may be used to join the outer edges of the two composite sheets, using an additional adhesive 26. The adhesive may be of any acid-resistant type, and will typically be a hot melt adhesive such as that used to integrate the layers. The result is a closed, physically separating envelope surrounding the plate on three sides, with the fourth side left open to allow attachment of an electrical connector to the plate. The plates are then cured (dried) prior to the forming process. After forming, the plates (electrodes) are alternated with those oppositely charged and placed into the battery housing. A traditional separator is not required because the plate is now covered by a physically separating composite of scrim and nanofiber layers. Dilute sulfuric acid is then added and the battery is sealed. The pasting paper will degrade over time in the electrolyte, but the chemically resistant nanofiber layer and scrim will stay intact and continue to prevent short circuiting while still affording very high ion exchange. Similarly, in cases where fibrous layer 12 is an absorptive glass mat rather than paper, the nanofiber layer 14 serves as the separator to prevent particle bridging. In this case, the structure prepared by adhering the composite sheets together can merely be slipped over the already pasted and dried plate, rather than using the composite as a pasting paper for applying the lead oxide.

Multilayer composite sheets according to the invention provide several advantages when used as combined battery pasting paper/separators. By combining the polymeric nanofiber web and scrim with the pasting paper, a permeable shield capable of physically separating the plates to prevent particle bridging can be added during the manufacture of the battery plate. This eliminates a separate step of installing a separator between the plates when producing the battery. The electrospun web has advantages of low density, large surface area to mass, high pore volume, and small pore size. The scrim provides strength to the composite sheet but is relatively thin. By obviating the need for a stand-alone separator, battery volume is increased, thereby providing more electrolyte and commensurately higher capacity and discharge rate. This larger volume can also allow the overall battery size to be reduced without sacrificing capacity or storage potential.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A multilayer composite sheet for use in a lead-acid battery, comprising
    a) a base layer comprising paper or a glass fiber mat;
    b) a layer of polymeric nanofibers bonded with discrete adhesive particles to a first surface of the base layer; and
    c) a scrim layer bonded with discrete adhesive particles to a surface of the layer of nanofibers opposite the base layer.

2. The composite sheet of claim 1, wherein the diameter of the nanofibers is in a range from 40 nm to 1000 nm.

3. The composite sheet of claim 1, wherein the diameter of the nanofibers is in a range from 100 nm to 400 nm.

4. The composite sheet of claim 1, wherein the layer of polymeric nanofibers has an average thickness in a range from 200 nm to 2000 nm.

5. The composite sheet of claim 1, wherein the layer of polymeric nanofibers has an average thickness in a range from 800 nm to 2000 nm.

6. The composite sheet of claim 1, wherein the layer of polymeric nanofibers has an average pore diameter in a range from 100 nm to 500 nm.

7. The composite sheet of claim 1, wherein the base layer comprises paper.

8. The composite sheet of claim 1, wherein each of the adhesive particles in b) and c) are hot melt adhesive particles.

9. The composite sheet of claim 1, wherein the base layer comprises a glass fiber mat.

10. The composite sheet of claim 9, wherein the glass fiber mat comprises borosilicate glass fibers.

11. The composite sheet of claim 9, wherein the glass fiber mat comprises a sulfate salt and colloidal silica dispersed therein.

12. The composite sheet of claim 11, wherein the glass fiber mat is a compressed mat capable of expanding in thickness after immersion in battery electrolyte.

13. A plate assembly for a lead-acid battery, comprising a lead plate having first and second opposing surfaces coated respectively with first and second layers comprising lead oxide, said first and second layers contacting first and second multilayer composite sheets respectively, each of said composite sheets comprising:
    a) a paper base layer;
    b) a layer of polymeric nanofibers bonded with discrete adhesive particles to a first surface of the paper base layer; and
    c) a scrim layer bonded with discrete adhesive particles to a surface of the layer of nanofibers opposite the paper base layer;
    wherein each of the first and second layers of the plate is adjacent and bonded to the paper base layer of the first and second multilayer composite sheets respectively on a second surface thereof opposite the first surface, and wherein the first and second multilayer composite sheets are adhered together so as to enclose the lead plate on three sides.

14. A plate assembly for a lead-acid battery, comprising a lead plate having first and second opposing surfaces coated respectively with first and second layers comprising lead oxide, at least one of said first and second layers contacting a multilayer composite sheet comprising:
    a) a glass fiber mat base layer;
    b) a layer of polymeric nanofibers bonded with discrete adhesive particles to a first surface of the glass fiber mat base layer; and
    c) a scrim layer bonded with discrete adhesive particles to a surface of the layer of nanofibers opposite the glass fiber mat base layer;
    wherein said at least one of the first and second layers of the plate is adjacent the glass fiber mat base layer of the multilayer composite sheet on a second surface thereof opposite the first surface.

15. The plate assembly according to claim 14, wherein said first and second layers contact first and second multilayer composite sheets respectively;

wherein each of the first and second layers of the plate is adjacent the glass fiber mat base layer of the first and second multilayer composite sheets respectively on a second surface thereof opposite the first surface, and wherein the first and second multilayer composite sheets are adhered together so as to enclose the lead plate on three sides.

* * * * *